United States Patent
Sugiyama (10) Patent No.: US 12,360,407 B2
(45) Date of Patent: Jul. 15, 2025

(54) OPTICAL DEVICE AND OPTICAL COMMUNICATION DEVICE

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 245 days.

(21) Appl. No.: 17/718,859

(22) Filed: Apr. 12, 2022

(65) Prior Publication Data
US 2022/0397782 A1    Dec. 15, 2022

(30) Foreign Application Priority Data
Jun. 11, 2021    (JP) .................. 2021-098198

(51) Int. Cl.
G02F 1/035    (2006.01)
H04B 10/516  (2013.01)

(52) U.S. Cl.
CPC ........ *G02F 1/0356* (2013.01); *G02F 2202/20* (2013.01); *H04B 10/516* (2013.01)

(58) Field of Classification Search
CPC ..................................... G02F 1/0356
See application file for complete search history.

(56) References Cited

U.S. PATENT DOCUMENTS

| | | | |
|---|---|---|---|
| 5,617,493 A | 4/1997 | Nishimoto | |
| 10,754,179 B2 * | 8/2020 | Ohmori | G02F 1/225 |
| 11,460,751 B2 * | 10/2022 | Umemoto | G02F 1/0316 |
| 11,914,233 B2 * | 2/2024 | Sugiyama | G02F 1/212 |
| 2002/0048076 A1 * | 4/2002 | Kondo | G02F 1/0356 |
| | | | 359/322 |
| 2002/0146190 A1 | 10/2002 | Doi et al. | |
| 2010/0080504 A1 * | 4/2010 | Shetrit | G02F 1/2257 |
| | | | 385/14 |
| 2019/0146302 A1 * | 5/2019 | Iwatsuka | G02F 1/035 |
| | | | 385/2 |
| 2020/0041824 A1 | 2/2020 | Ohmori et al. | |
| 2020/0271963 A1 * | 8/2020 | Iwatsuka | G02F 1/2255 |
| 2021/0096441 A1 * | 4/2021 | Umemoto | G02F 1/2257 |
| 2022/0397782 A1 * | 12/2022 | Sugiyama | G02F 1/0356 |

FOREIGN PATENT DOCUMENTS

| | | |
|---|---|---|
| JP | 06-067130 | 3/1994 |
| JP | 08-166565 | 6/1996 |
| JP | 2002-040381 | 2/2002 |
| JP | 2004-279865 A | 10/2004 |
| JP | 2020-181070 A | 11/2020 |

OTHER PUBLICATIONS

Japanese Office Action issued in counterpart Japanese Application No. 2021-098198 dated Oct. 1, 2024.
Japanese Office Action issued in corresponding Japanese Application No. 2021-098198 dated Feb. 25, 2025.

\* cited by examiner

*Primary Examiner* — Rhonda S Peace
(74) *Attorney, Agent, or Firm* — STAAS & HALSEY LLP (57) ABSTRACT

An optical device includes an optical waveguide, a buffer layer that is layered on the optical waveguide, and an electrode that is arranged on a surface of the buffer layer that is layered in a part near the optical waveguide and that applies an electric signal to the optical waveguide. The optical device further includes a slit that is formed in the buffer layer, that extends from the surface of the buffer layer to a vicinity of the optical waveguide, and that is filled with part of the electrode.

12 Claims, 6 Drawing Sheets

OPTICAL DEVICE AND OPTICAL COMMUNICATION DEVICE

CROSS-REFERENCE TO RELATED APPLICATION

This application is based upon and claims the benefit of priority of the prior Japanese Patent Application No. 2021-098198, filed on Jun. 11, 2021, the entire contents of which are incorporated herein by reference.

FIELD

The embodiments discussed herein are related to an optical device and an optical communication device.

BACKGROUND

A conventional optical modulator consists of optical waveguides that are provided on a substrate and a modulator that is provided near the optical waveguide. The modulator includes a signal electrode and a ground electrode and, when a voltage is applied to the signal electrode, an electric field is generated in the optical waveguide and accordingly the refractive index of the optical waveguide varies and the phase of light varies. The optical waveguides configure a Mach-Zehnder interferometer and an optical phase difference between waveguides changes the light output.

In the optical modulator, for example, four-channel Mach-Zehnder modulators are integrated. Each Mach-Zehnder interferometer includes an RF modulator and a DC modulator. For example, a high-frequency signal having a bandwidth of few tens of GHz is input to an electrode of the RF modulator to perform fast modulation. A bias voltage is applied to an electrode of the DC modulator and the bias voltage is adjusted such that on/off of an electric signal corresponds to on/off of an optical signal.

The optical waveguides of the optical modulator, for example, configure a Mach-Zehnder interferometer and output IQ signals obtained by performing XY polarization multiplexing according to a phase difference of light between a plurality of optical waveguides that are arranged in parallel. Outputs of four channels are combined by every two channels into two IQ signals and polarization rotation is performed on one of the two IQ signals and a polarization beam combiner performs polarization multiplexing and makes an output.

On the other hand, the optical waveguides includes, for example, a diffusion optical waveguide that is formed in a position not overlapping the signal electrode by diffusing metal, such as titanium, from a surface of the substrate. The diffusion optical waveguide however has small light confinement and thus the efficiency in applying an electric field is poor and thus the drive voltage increases. Thus, there is a film optical waveguide in which an optical waveguide using a film of lithium niobate (LN) crystal is formed in a position not overlapping the signal electrode. The film optical waveguide makes it possible to enhance light enclosure more than the diffusion optical waveguide in which metal is diffused, improve the efficiency in applying an electric field, and reduce the drive voltage.

Figure 9:
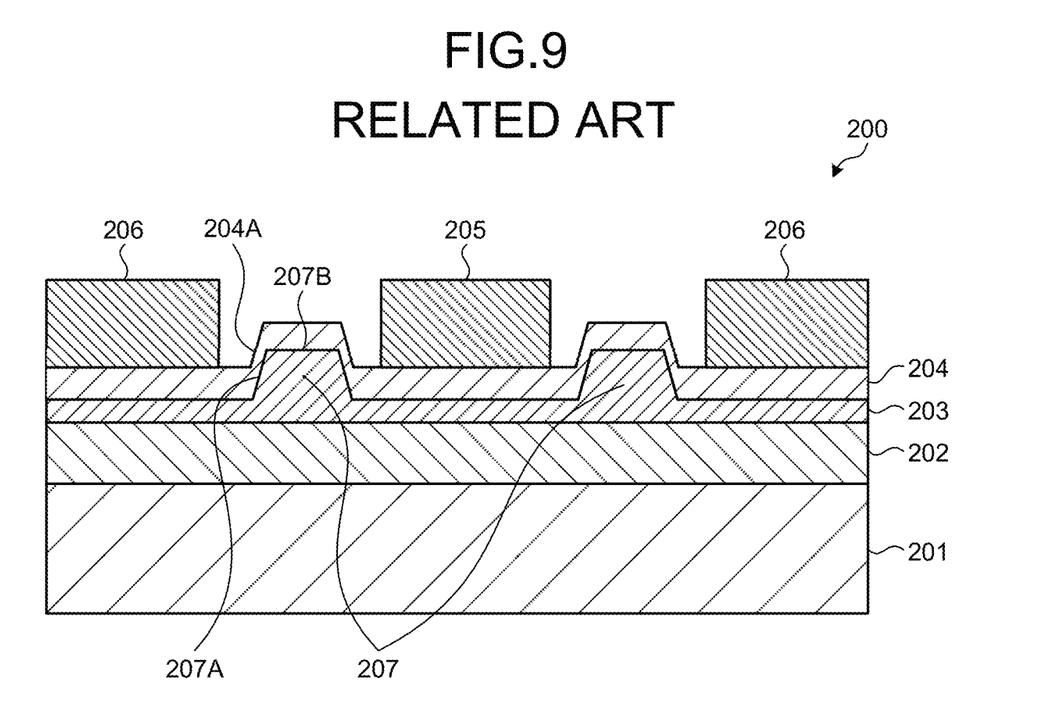
FIG. 9 is a schematic cross-sectional view illustrating an example of a DC modulator of an optical modulator.

The optical modulator includes the RF modulator and the DC modulator. FIG. 9 is a schematic cross-sectional view illustrating an example of a DC modulator 200 of an optical modulator. The DC modulator 200 illustrated in FIG. 9 includes a support substrate 201 of silicon (Si), or the like, and an intermediate layer 202 that is layered on the support substrate 201. The DC modulator 200 further includes a film LN substrate 203 that is layered on the intermediate layer 202 and a buffer layer 204 of $Sio_2$ that is layered on the film LN substrate 203.

Protruding film optical waveguides 207 that protrude upward are formed on the film LN substrate 203. The film LN substrate 203 and the film optical waveguides 207 are covered with a buffer layer 204 and a signal electrode 205 and a pair of ground electrodes 206 that form a coplanar (coplanar waveguide (CPW)) structure are arranged on the surface of the buffer layer 204. In other words, the signal electrode 205 and the ground electrodes 206 in a pair with the signal electrode 205 in between are arranged on the buffer layer 204. Note that the buffer layer 204 makes it possible to prevent light that propagates through the film optical waveguides 207 from being absorbed into the signal electrode 205 and the ground electrodes 206.

The protruding film optical waveguide 207 is formed on the film LN substrate 203 that is positioned between the signal electrode 205 and the ground electrode 206. The protruding film optical waveguide 207 includes a side face part 207A and a flat face 207B. Furthermore, the buffer layer 204 that is positioned between the signal electrode 205 and the ground electrode 206 has a step 204A that covers the entire protruding film optical waveguide 207.

According to the film optical waveguide 207 described above, generating an electric field by applying a drive voltage of an electric signal to the signal electrode 205 and changing a refractive index of the film optical waveguide 207 make it possible to modulate light that propagates through the film optical waveguide 207 by changing a refractive index of the film optical waveguides 207. Note that, while the RF modulator is different from the DC modulator 200 in that the RF modulator applies a high-frequency voltage instead of a drive voltage to the signal electrode 205, the RF modulator is approximately the same structure as that of the DC modulator 200 and description of the configuration and operations of the RF modulator will be omitted.

Patent Literature 1: Japanese Laid-open Patent Publication No. 2004-279865
Patent Literature 2: Japanese Laid-open Patent Publication No. 2020-181070
Patent Literature 3: US Patent Publication No. 2002/0146190

In the film optical waveguides 207 of the optical modulator, because the buffer layer 204 serves as a cladding, a mode field of light that propagates through the film optical waveguide 207 enters the buffer layer 204. By increasing the thickness of the buffer layer 204, it is possible to prevent the light in the film optical waveguides 207 from being absorbed into the signal electrode 205 and the ground electrodes 206. Increasing the thickness of the buffer layer 204, however, reduces the electric filed that is applied to the film optical waveguides 207, which therefore lowers efficiency in applying an electric field.

SUMMARY

According to an aspect of an embodiment, an optical device includes an optical waveguide, a buffer layer, an electrode and a slit. The buffer layer is layered on the optical waveguide. The electrode is arranged on a surface of the buffer layer that is layered in a part near the optical waveguide. The electrode applies an electric signal to the optical waveguide. The slit is formed in the buffer layer. The slit extends from the surface of the buffer layer to a vicinity of the optical waveguide. The slit is filled with part of the electrode.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the embodiments do not limit the disclosure.

[a] First Embodiment

Figure 1:
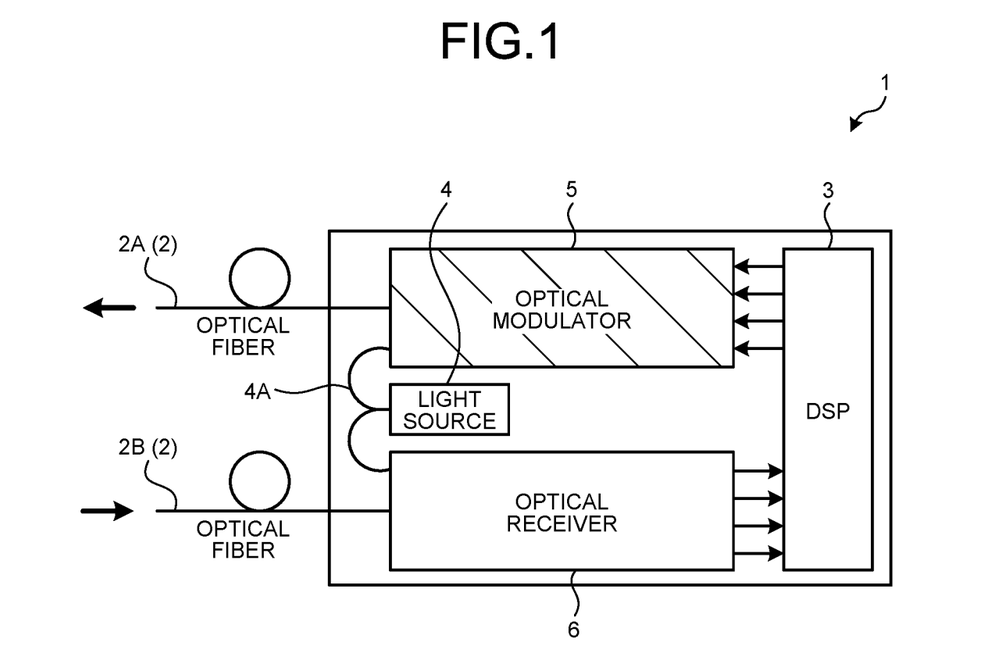
FIG. 1 is a block diagram illustrating an example of a configuration of an optical communication device of a first embodiment.

FIG. 1 is a block diagram illustrating an example a configuration of an optical communication device 1 of a first embodiment. The optical communication device 1 illustrated in FIG. 1 is connected to an optical fiber 2A (2) on an output side and an optical fiber 2B (2) on an input side. The optical communication device 1 includes a digital signal processor (DSP) 3, a light source 4, an optical modulator 5, and an optical receiver 6. The DSP 3 is an electric part that executes digital signal processing. The DSP 3, for example, executes processing, such as coding of transmission data, generates an electric signal containing the transmission data, and outputs the generated electric signal to the optical modulator 5. The DSP 3 acquires an electric signal containing reception data from the optical receiver 6 and executes processing, such as decoding of the acquired electric signal, thereby obtaining the reception data.

The light source 4 includes, for example, a laser diode, etc., generates light of a given wavelength, and supplies the generated light to the optical modulator 5 and the optical receiver 6. The optical modulator 5 is an optical device that modulates light that is supplied from the light source 4 according to an electric signal that is output from the DSP 3 and that outputs a resultant optical transmission signal to the optical fiber 2A. The optical modulator 5 is, for example, an optical device, such as a lithium niobate (LN) optical modulator including a LN optical waveguide and a modulator. The LN optical waveguide is formed of a substrate of LN crystal. When light that is supplied from the light source 4 propagates through the LN optical waveguide, the optical modulator 5 modulates the light according to an electric signal that is input to the modulator, thereby generating an optical transmission signal.

The optical receiver 6 receives an optical signal from the optical fiber 2B and demodulates the received optical signal using light that is supplied from the light source 4. The optical receiver 6 converts the demodulated received optical signal into an electric signal and outputs the electric signal after the conversion to the DSP 3.

Figure 2:
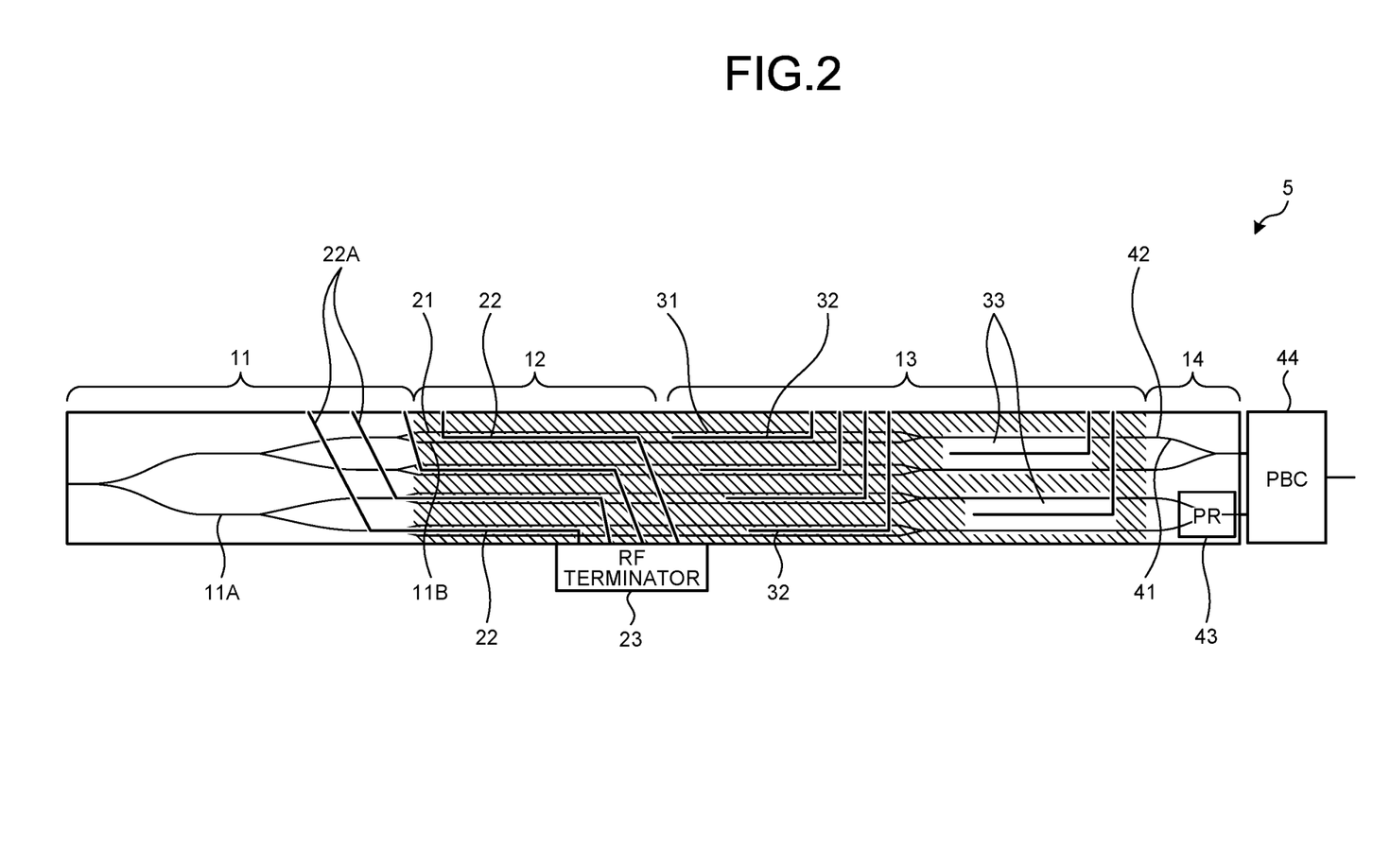
FIG. 2 is a plane schematic view illustrating an example of a configuration of an optical modulator of the first embodiment.

FIG. 2 is a plane schematic view illustrating an example of a configuration of the optical modulator 5 according to the first embodiment. In the optical modulator 5 illustrated in FIG. 2, the optical fiber 4A from the light source 4 is connected to an input side and the optical fiber 2A for outputting a transmission signal is connected to an output side. The optical modulator 5 includes a first optical input unit 11, a radio frequency (RF) modulator 12, a direct current (DC) modulator 13, and a first optical output unit 14. The first optical input unit 11 includes a first optical waveguide 11A and a first waveguide joint 11B. The first optical waveguide 11A includes a single optical waveguide that is connected to the optical fiber 4A, two optical waveguides into which the single optical waveguide bifurcates, four optical waveguides into which the two optical waveguides bifurcate, and eight optical waveguides into which the four optical waveguides bifurcate. The first waveguide joint 11B joins the eight optical waveguides in the first optical waveguide 11A and eight LN optical waveguides in an LN optical waveguide 21.

The RF modulator 12 includes the LN optical waveguide 21, an electrode part 22, and an RF terminator 23. When light that is supplied from the first optical waveguide 11A propagates through the LN optical waveguide 21, the RF modulator 12 modulates the light using an electric field that is applied from a signal electrode 22A of the electrode part 22. The LN optical waveguide 21 is, for example, an optical waveguide that is formed using a film LN substrate 53, that repeats bifurcating from the input side and that thus includes eight parallel LN optical waveguides. The light that propagates through the LN optical waveguide 21 and is modulated is output to a first DC modulator 32 in the DC modulator 13. The film LN substrate 53 is an X-cut substrate whose refractive index increases when a DC voltage is applied in the direction of an X-axis of crystal.

The signal electrode 22A in the electrode part 22 is provided in a position not overlapping the LN optical waveguide 21 and applies an electric field to the LN optical waveguide 21 according to an electric signal that is output from the DSP 3. The terminal of the signal electrode 22A in the electrode part 22 is connected to the RF terminator 23. The RF terminator 23 is connected to the terminal of the signal electrode 22A and prevents unnecessary reflection of the signal that is transmitted by the signal electrode 22A.

The DC modulator 13 includes an LN optical waveguide 31 that is joined to the LN optical waveguide 21 of the RF modulator 12, the first DC modulator 32, and a second DC modulator 33. The first DC modulator 32 includes four child Mach-Zehnders (MZ). The second DC modulator 33 includes two parent Mach-Zehnders (MZ). The first DC modulator 32 includes the LN optical waveguide 31 and the electrode part 22.

The LN optical waveguide 31 includes eight LN optical waveguides and four LN optical waveguides that join two LN optical waveguides among the eight LN optical waveguides. In the eight LN optical waveguides 31, the first DC modulator 32 is arranged at every two LN optical waveguides. The first DC modulator 32 applies a bias voltage to the signal electrode 22A above the LN optical waveguide 31, thereby adjusts the bias voltage such that on/off of an electric signal corresponds to on/off of an optical signal, and outputs an I signal of an in-phase component or a Q signal of a quadrature component. In the four LN optical waveguides in the LN optical waveguide 31, the second DC modulator 33 is arranged at every two LN optical waveguides. The second DC modulator 33 applies a bias voltage to the signal electrode 22A above the LN optical waveguide 31, thereby adjusts a bias voltage such that on/off of an electric signal corresponds to on/off of an optical signal, and outputs an I signal or a Q signal.

The first optical output unit 14 includes a second waveguide joint 41, a second optical waveguide 42, a polarization rotator (PR) 43, and a polarization beam combiner (PBC) 44. The second waveguide joint 41 joins the LN optical waveguide 31 in the DC modulator 13 and the second optical modulator 42. The second optical waveguide 42 includes four optical waveguides that are connected to the second waveguide joint 41 and two optical waveguides that join two optical waveguides among the four optical waveguides.

The PR 43 rotates the I signal or the Q signal that is input from one of the second DC modulators 33 by 90 degrees and obtains a vertically-polarized optical signal after the 90 degree rotation. The PR 43 inputs the vertically-polarized optical signal to the PBC 44. The PBC 44 multiplexes the vertically-polarized optical signal from the PR 43 and a horizontally-polarized optical signal from the other second DC modulator 33 and outputs a polarization multiplexed signal.

Figure 3:
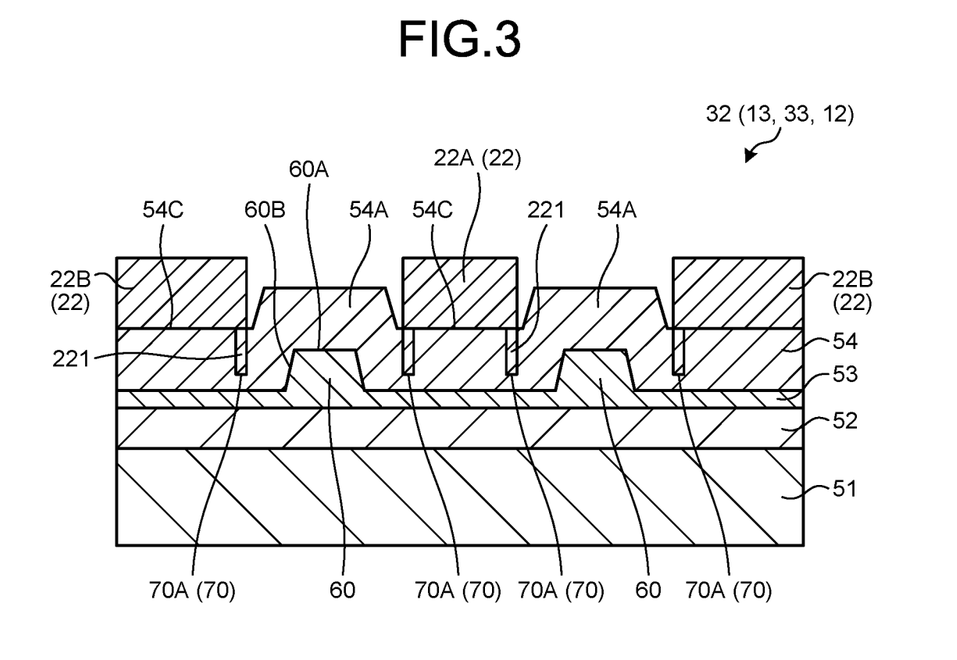
FIG. 3 is a schematic cross-sectional view illustrating an example of a first DC modulator of the optical modulator of the first embodiment.

A configuration of the optical modulator 5 of the first embodiment will be described specifically next. FIG. 3 is a schematic cross-sectional view illustrating an example of the first DC modulator 32 of the optical modulator 5 of the first embodiment. Note that, because the first DC modulator 32 and the second DC modulator 33 have the same configuration, the same components will be denoted with the same reference numerals and thus description of the redundant configuration and operations of the second DC modulator 33 will be omitted. The first DC modulator 32 illustrated in FIG. 3 includes a support substrate 51 and an intermediate layer 52 that is layered on the support substrate 51. The first DC modulator 32 further includes a film LN substrate 53 that is a film substrate and that is layered on the intermediate layer 52, a buffer layer 54 that is layered on the film LN substrate 53, and an electrode part 22 that is layered on the buffer layer 54. The electrode part 22 includes the signal electrode 22A and ground electrodes 22B in a pair.

A protruding film optical waveguide 60 that protrudes upward is formed on the film LN substrate 53. The film optical waveguide 60 is the LN optical waveguide 31 of the DC modulator 13. The film LN substrate 53 and the film optical waveguide 60 are covered with the buffer layer 54. The buffer layer 54 is provided in order to prevent light that propagates through the film optical waveguide 60 from being absorbed into the electrode part 22. A slit 70 (70A) that extends from an arrangement face 54C of the buffer layer 54 to the vicinity of the film optical waveguide 60 is formed in the buffer layer 54. The slit 70A extends vertically to a surface of the buffer layer 54 from the arrangement face 54C of the buffer layer 54 on which the electrode part 22 is arranged. Note that the slit 70A that extends from the arrangement face 54C of the buffer layer 54 in the vertical direction is, for example, formed by etching, or the like, or formed as a void by sputtering.

A protruding film optical waveguide 60 is formed on the film LN substrate 53 that is positioned between the signal electrode 22A and the ground electrode 22B. The film optical waveguide 60 is a protruding rib optical waveguide that is provided in a given position on the film LN substrate 53. The protruding film optical waveguide 60 includes a side wall face 60A and a side face part 60B. Furthermore, the buffer layer 54 that is positioned between the signal electrode 22A and the ground electrode 22B, too, has a step 54A that covers the entire protruding film optical waveguide 60. The step 54A that covers the side face part 60B of the film optical waveguide 60 separates the ground electrode 22B and the signal electrode 22A.

The electrode part 22 is arranged on the arrangement face 54C that is the surface of the buffer layer that is layered in a part near the film optical waveguide 60, the slit 70A is filled with part 221 of the electrode, and the electrode part 22 applies a drive voltage to the film optical waveguide 60. As for the signal electrode 22A that is arranged on the arrangement face 54C of the buffer layer 54, the slit 70A is filled with the part 221 of the electrode and the tip of the part 221 of the electrode is set close to the side face part 60B of the film optical waveguide 60. As for the ground electrode 22B that is arranged on the arrangement face 54C of the buffer layer 54, the slit 70A is filled with the part 221 of the electrode and the tip of the part 221 of the electrode is set close to the side face part 60B of the film optical waveguide 60.

The film LN substrate 53 with a thickness of 0.5 to 3 µm is interposed between the intermediate layer 52 and the buffer layer 54 and the protruding film optical waveguide 60 that protrudes upward is formed on the film LN substrate 53. The width of the protrusion serving as the film optical waveguide 60 is, for example, approximately 1 to 8 µm. The film LN substrate 53 and the film optical waveguide 60 are covered with the buffer layer 54.

It is preferable that the material of the signal electrode 22A be different from that of the ground electrode 22B with a small high-frequency loss.

The signal electrode 22A is, for example, an electrode that is made of a metal material, such as gold or copper, and that has a width of 2 to 10 µm and a thickness of 1 to 20 µm. The ground electrode 22B is, for example, an electrode that is made of a metal material, such as gold or copper, and that has a thickness of 1 µm or larger. A drive voltage corresponding to an electric signal that is output from the DSP 3 is transmitted by the signal electrode 22A, accordingly an electric field in a direction from the signal electrode 22A to the ground electrode 22B is generated, and the electric field is applied to the film optical waveguide 60. As a result, the refractive index of the film optical waveguide 60 changes according to application of the electric field to the film optical waveguide 60, which makes it possible to modulate light that propagates through the film optical waveguide 60.

The first DC modulator 32 of the first embodiment includes the slit 70A that is formed in the buffer layer 54, that extends from the surface of the buffer layer 54 to the vicinity of the film optical waveguide 60, and that is filled with part of the electrode. In the first DC modulator 32, the part 221 of the electrode of the ground electrode 22B and the part 221 of the electrode of the signal electrode 22A are arranged in the slits 70A. In the first DC modulator 32, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

FIG. 3 exemplifies the first DC modulator 32 and the second DC modulator 33 has the same configuration. The second DC modulator 33 includes the slit 70A that is formed in the buffer layer 54, that extends from the surface of the buffer layer 54 to the vicinity of the film optical waveguide 60, and that is filled with part of the electrode. In the second DC modulator 33, the part 221 of the electrode of the ground electrode 22B and the part 221 of the electrode of the signal electrode 22A are arranged in the slits 70A. In the second DC modulator 33, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

The RF modulator 12 has approximately the same configuration as that of the first DC modulator 32. The RF modulator 12 is different from the first DC modulator in that a high-frequency signal is applied to the signal electrode 22A instead of a drive voltage. Accordingly, description of the redundant configuration and operations will be omitted. Note that the film optical waveguide 60 corresponds to the LN optical waveguide 21 of the RF modulator 12. The RF modulator 12 includes the slit 70A that is formed in the buffer layer 54, that extends from the surface of the buffer layer 54 to the vicinity of the film optical waveguide 60, and that is filled with part of the electrode. In the RF modulator 12, the part 221 of the electrode of the ground electrode 22B and the part 221 of the electrode of the signal electrode 22A are arranged in the slits 70A. In the RF modulator 12, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

Furthermore, the optical modulator 5 includes the rib film optical waveguide 60 that is formed using the X-cut LN substrate 53, which makes it easier to apply a horizontal electric field to the film optical waveguide 60.

As for the first DC modulator 32 of the first embodiment, the case where the slit 70A is arranged in the direction vertical to the arrangement face 54C of the buffer layer 54 is exemplified; however, the arrangement is not limited to this, and an embodiment thereof will be described as a second embodiment below.

[b] Second Embodiment

Figure 4:
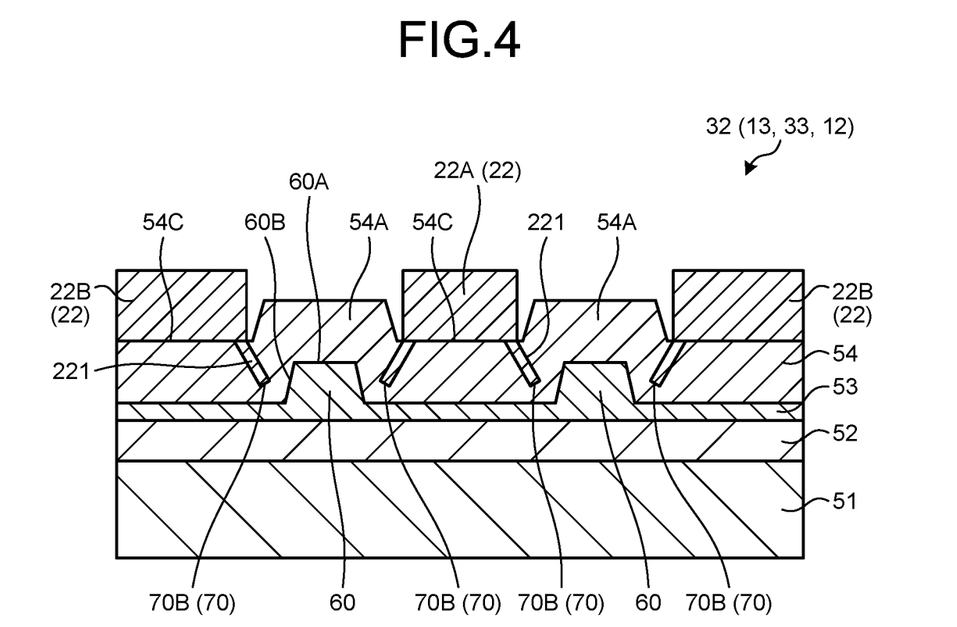
FIG. 4 is a schematic cross-sectional view illustrating an example of a first DC modulator of an optical modulator of a second embodiment.

FIG. 4 is a schematic cross-sectional view illustrating an example of the first DC modulator 32 of the optical modulator 5 of the second embodiment. Note that the same components as those of the optical modulator 5 of the first embodiment will be denoted with the same reference numerals as those of the first embodiment and thus description of the redundant components and operations will be omitted. The first DC modulator 32 illustrated in FIG. 4 is different from the first DC modulator 32 illustrated in FIG. 3 in that a slit 70B is extended obliquely from the arrangement face 54C of the buffer layer 54 toward the side face part 60B of the film optical waveguide 60. The slit 70B is in a state of being filled with the part 221 of the electrode part 22.

The electrode part 22 is arranged on the arrangement face 54C that is the surface of the buffer layer 54 that is layered in a part near the film optical waveguide 60, the slit 70B is filled with part 221 of the electrode from the arrangement face 54C, and the electrode part 22 applies a drive voltage to the film optical waveguide 60. As for the signal electrode 22A that is arranged on the arrangement face 54C of the buffer layer 54, the slit 70B is filled with the part 221 of the electrode and the tip of the part 221 of the electrode is set close to the side face part 60B of the film optical waveguide 60. As for the ground electrode 22B that is arranged on the arrangement face 54C of the buffer layer 54, the slit 70B is filled with the part 221 of the electrode and the tip of the part 221 of the electrode is set close to the side face part 60B of the film optical waveguide 60.

In the first DC modulator 32 of the second embodiment, the part 221 of the electrode of the ground electrode 22B and the part 221 of the electrode of the signal electrode 22A are arranged in the slits 70B that extend obliquely to the vicinity of the side face parts 60B of the film optical waveguide 60. In the first DC modulator 32, compared to the first embodiment, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

In the second DC modulator 33, the part 221 of the electrode of the ground electrode 22B and the part 221 of the electrode of the signal electrode 22A are arranged in the slits 70B that extend obliquely to the vicinity of the side face parts 60B of the film optical waveguide 60. In the second DC modulator 33, compared to the first embodiment, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

In the RF modulator 12, the part 221 of the electrode of the ground electrode 22B and the part 221 of the electrode of the signal electrode 22A are arranged in the slits 70B that extend obliquely to the vicinity of the side face parts 60B of the film optical waveguide 60. In the RF modulator 12, compared to the first embodiment, because the distance between the ground electrode 22B and the film optical waveguide 60 and the distance between the signal electrode 22A and the film optical waveguide 60 are set short, the electric field to be applied to the film optical waveguide 60 is strong. As a result, even when the thickness of the buffer layer 54 increases, improving efficiency in applying an electric field makes it possible to reduce a drive voltage.

As for the first DC modulator 32 of the first embodiment, the case where the slit 70B that extends obliquely from the arrangement face 54C to the side face part 60B of the film optical waveguide 60 is formed in the buffer layer 54 is exemplified; however, for example, a crack that occurs between the film optical waveguide 60 and the buffer layer 54 when the buffer layer 54 is layered on the film LN substrate 53 may serve as the slit 70B.

As for the first DC modulator 32 of the second embodiment, the rib optical waveguide is exemplified as the film optical waveguide 60; however, the film optical waveguide 60 is not limited thereto and an embodiment thereof will be described as a third embodiment below.

[c] Third Embodiment

Figure 5:
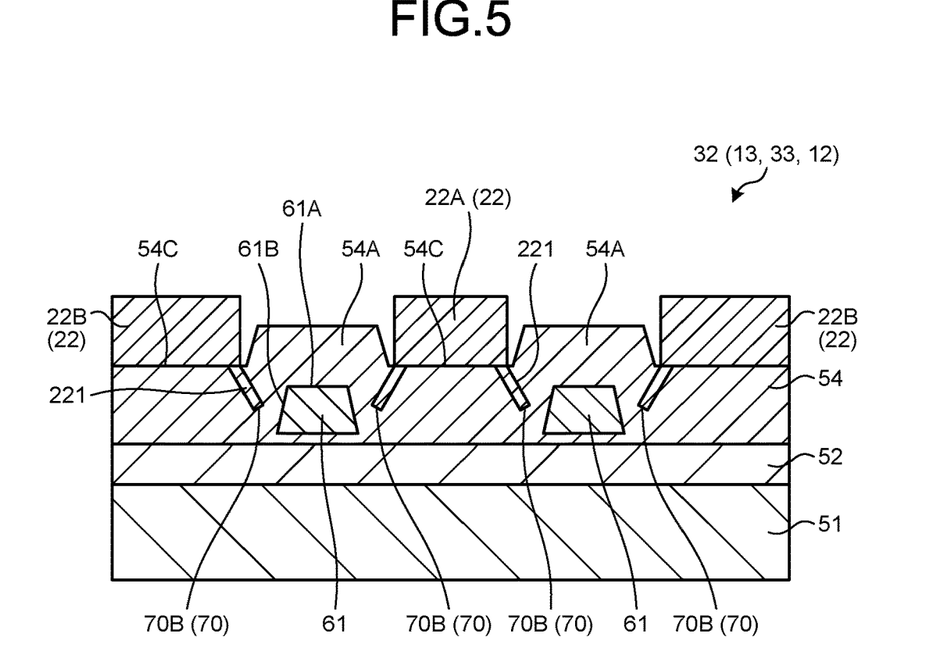
FIG. 5 is a schematic cross-sectional view illustrating an example of a first DC modulator of an optical modulator of a third embodiment.

FIG. 5 is a schematic cross-sectional view illustrating an example of the first DC modulator 32 of the optical modulator 5 of the third embodiment. Note that the same components as those of the optical modulator 5 of the second embodiment will be denoted with the same reference numerals as those of the first embodiment and thus description of the redundant components and operations will be omitted. The first DC modulator 32 illustrated in FIG. 5 is different from the first DC modulator 32 illustrated in FIG. 4 in that a film optical waveguide 61 that is a channel waveguide replaces the film optical waveguide 60 that is a rib waveguide. Furthermore, the slit 70B is structured such that the slit 70B is extended from the arrangement face 54C of the buffer layer 54 on which the electrode part 22 is arranged to the vicinity of the side surface of the film optical waveguide 61. The film optical waveguide 61 includes a flat face 61A and a side face part 61B.

The electrode part 22 is arranged on the arrangement face 54C that is the surface of the buffer layer 54 that is layered in a part near the film optical waveguide 61, the slit 70B is filled with the part 221 of the electrode from the arrangement face 54C, and the electrode part 22 applies a drive voltage to the film optical waveguide 61. As for the signal electrode 22A that is arranged on the arrangement face 54C of the buffer layer 54, the slit 70B is filled with the part 221 of the electrode and the tip of the part 221 of the electrode is set close to the side face part 61B of the film optical waveguide 61. As for the ground electrode 22B that is arranged on the arrangement face 54C of the buffer layer 54, the slit 70B is filled with the part 221 of the electrode and the tip of the part 221 of the electrode is set close to the side face part 61B of the film optical waveguide 61.

In the first DC modulator 32 of the third embodiment, the part 221 of the electrode of the ground electrode 22B and the part 221 of the electrode of the signal electrode 22A are arranged in the slits 70B. In the first DC modulator 32, because the distance between the ground electrode 22B and the film optical waveguide 61 and the distance between the signal electrode 22A and the film optical waveguide 61 are set short, the electric field to be applied to the film optical waveguide 61 is strong. As a result, even when the thickness of the buffer layer 54 increases, improving efficiency in applying an electric field makes it possible to reduce a drive voltage.

In the second DC modulator 33, the part 221 of the electrode of the ground electrode 22B and the part 221 of the electrode of the signal electrode 22A are arranged in the slits 70B. In the second DC modulator 33, because the distance between the ground electrode 22B and the film optical waveguide 61 and the distance between the signal electrode 22A and the film optical waveguide 61 are set short, the electric field to be applied to the film optical waveguide 61 is strong. As a result, even when the thickness of the buffer layer 54 increases, improving efficiency in applying an electric field makes it possible to reduce a drive voltage.

In the RF modulator 12, the part 221 of the electrode of the ground electrode 22B and the part 221 of the electrode of the signal electrode 22A are arranged in the slits 70B. In the RF modulator 12, because the distance between the ground electrode 22B and the film optical waveguide 61 and the distance between the signal electrode 22A and the film optical waveguide 61 are set short, the electric field to be applied to the film optical waveguide 61 is strong. As a result, even when the thickness of the buffer layer 54 increases, improving efficiency in applying an electric field makes it possible to reduce a drive voltage.

As for the first DC modulator 32, the case where the slit 70B is formed in the arrangement surface 54C of the buffer layer 54 is exemplified. When the electrode part 22 is formed in the arrangement face 54C, the electrode part 22 would possibly be misaligned with respect to the arrangement face 54C and the slit 70B would not possibly be filled with the part 221 of the electrode. An embodiment for dealing with such a situation will be described as a fourth embodiment.

[d] Fourth Embodiment

Figure 6:
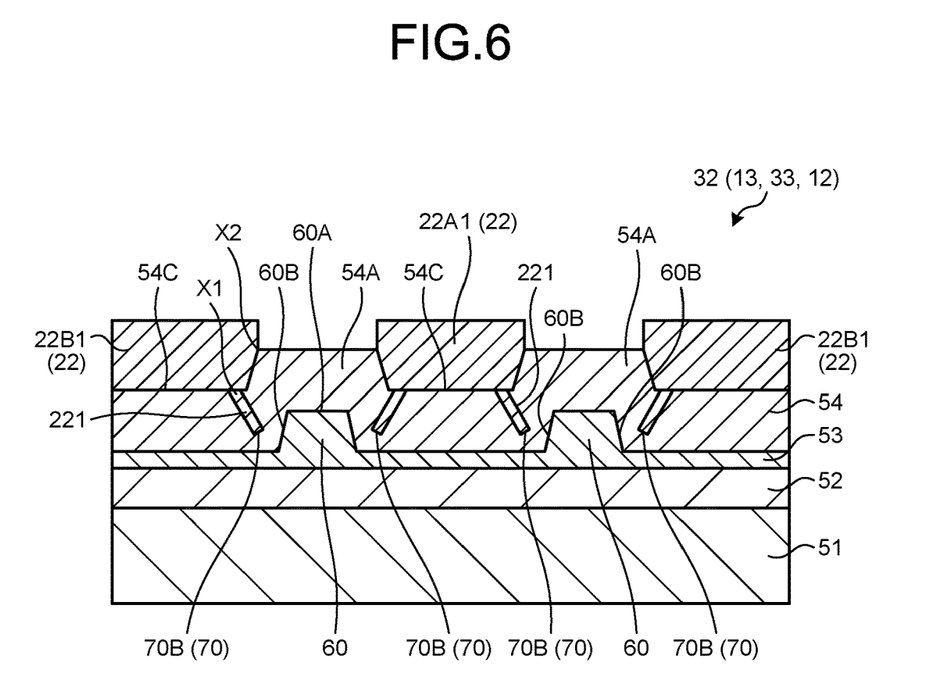
FIG. 6 is a schematic cross-sectional view illustrating an example of a first DC modulator of an optical modulator of a fourth embodiment.

FIG. 6 is a schematic cross-sectional view illustrating an example of the first DC modulator 32 of the optical modulator 5 of the fourth embodiment. Note that the same components as those of the optical modulator 5 of the second embodiment will be denoted with the same reference numerals as those of the second embodiment and thus description of the redundant components and operations will be omitted. The first DC modulator 32 illustrated in FIG. 6 is different from the first DC modulator 32 illustrated in FIG. 4 in that an inlet of the slit 70B is arranged within the arrangement face 54C of the buffer layer 54 on which the electrode part 22 is arranged. A position X1 of the inlet of the slit 70B in the arrangement face 54C is arranged on an inner side with respect to a position X2 of an end face of the electrode part 22.

The inlet of the slit 70B is arranged within the arrangement face 54C for a signal electrode 22A1 and thus, when the signal electrode 22A1 is formed within the arrangement face 54C, it is possible to fill the slit 70B with the part 221 of the electrode.

The inlet of the slit 70B is arranged within the arrangement face 54C for a ground electrode 22B1 and thus, when the ground electrode 22B1 is formed within the arrangement face 54C, it is possible to fill the slit 70B with the part 221 of the electrode.

In the first DC modulator 32 of the fourth embodiment, because the inlets of the slits 70B are arranged within the arrangement face 54C for the electrode part 22, when the electrode part 22 is formed within the arrangement face 54C, it is possible to fill the slits 70B with the part 221 of the electrodes even when the electrode part 22 is slightly misaligned with respect to the arrangement face 54C.

In the second DC modulator 33, because the inlets of the slits 70B are arranged within the arrangement face 54C for the electrode part 22, when the electrode part 22 is formed within the arrangement face 54C, it is possible to fill the slits 70B with the part 221 of the electrodes even when the electrode part 22 is slightly misaligned with respect to the arrangement face 54C.

In the RF modulator 12, because the inlets of the slits 70B are arranged within the arrangement face 54C for the electrode part 22, when the electrode part 22 is formed within the arrangement face 54C, it is possible to fill the slits 70B with the part 221 of the electrodes even when the electrode part 22 is slightly misaligned with respect to the arrangement face 54C.

Note that, as for the first DC modulator 32 of the first embodiment, the case where the slit 70 is arranged in the arrangement face 54C for the signal electrode 22A and the slit 70 is arranged in the arrangement face 54C for the ground electrode 22B is exemplified; however, the slit 70 is not limited thereto, and an embodiment thereof will be described as a fifth embodiment below.

[e] Fifth Embodiment

Figure 7:
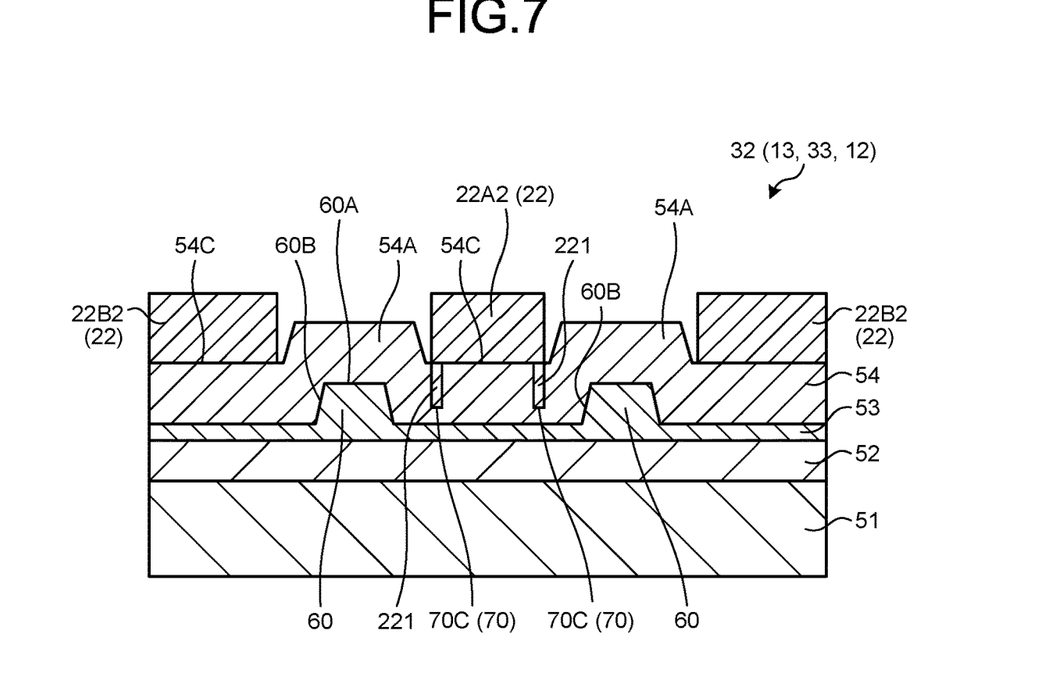
FIG. 7 is a schematic cross-sectional view illustrating an example of a first DC modulator of an optical modulator of a fifth embodiment.

FIG. 7 is a schematic cross-sectional view illustrating an example of the first DC modulator 32 of the optical modulator 5 of the fifth embodiment. Note that the same components as those of the optical modulator 5 of the first embodiment will be denoted with the same reference numerals as those of the first embodiment and thus description of the redundant components and operations will be omitted. The first DC modulator 32 illustrated in FIG. 7 is different from the first DC modulator 32 illustrated in FIG. 3 in that a slit 70C is formed in the arrangement face 54C for a signal electrode 22A2 without formation of the slit 70 in the arrangement face 54C for a ground electrode 22B2. In the arrangement face 54C for the signal electrode 22A2, the slit 70C that extends vertically such that the slit 70C is close to the side face part 60B of one of the film optical waveguides 60 is formed. Furthermore, in the arrangement face 54C for the signal electrode 22A2, the slit 70C that extends vertically such that the slit 70C is close to the side face part 60B of the other film optical waveguides 60 is formed. The slit 70C is filled with the part 221 of the electrode of the signal electrode 22A2 on the arrangement face 54C.

The electrode part 22 absorbs light from the film optical waveguide 60, which increases an optical loss. Such an optical loss could occur both in the signal electrode 22A2 and the ground electrode 22B2. Thus, in order to increase efficiency in applying an electric field of the signal electrode 22A2, the slits 70C are formed in only the arrangement face 54C on the side of the signal electrode 22A2.

The first DC modulator 32 of the fifth embodiment includes the slit 70C that extends from the arrangement face 54C for the signal electrode 22A2 to the vicinity of the film optical waveguides 60 and that is filled with part of the electrode. In the first DC modulator 32, the part 221 of the electrode of the signal electrode 22A2 is arranged in the slit 70C. In the first DC modulator 32, because the distance between the signal electrode 22A2 and the film optical waveguide 60 are set short, the electric field to be applied to the film optical waveguide 60 is strong. As a result, in the first DC modulator 32, because only the signal electrode 22A2 is set close to the film optical waveguide 60 via the slit 70C, it is possible to inhibit the optical loss compared to both the signal electrode 22A and the ground electrode 22B.

The second DC modulator 33 includes the slit 70C that extends from the arrangement face 54C for the signal electrode 22A2 to the vicinity of the film optical waveguides 60 and that is filled with part of the electrode. In the second DC modulator 33, the part 221 of the electrode of the signal electrode 22A2 is arranged in the slit 70C. In the second DC modulator 33, because the distance between the signal electrode 22A2 and the film optical waveguide 60 are set short, the electric field to be applied to the film optical waveguide 60 is strong. As a result, in the second DC modulator 33, because only the signal electrode 22A2 is set close to the film optical waveguide 60 via the slit 70C, it is possible to inhibit the optical loss compared to both the signal electrode 22A and the ground electrode 22B.

The RF modulator 12 includes the slit 70C that extends from the arrangement face 54C for the signal electrode 22A2 to the vicinity of the film optical waveguides 60 and that is filled with part of the electrode. In the RF modulator 12, the part 221 of the electrode of the signal electrode 22A2 is arranged in the slit 70C. In the RF modulator 12, because the distance between the signal electrode 22A2 and the film optical waveguide 60 are set short, the electric field to be applied to the film optical waveguide 60 is strong. As a result, in the RF modulator 12, because only the signal electrode 22A2 is set close to the film optical waveguide 60 via the slit 70C, it is possible to inhibit the optical loss compared to both the signal electrode 22A and the ground electrode 22B.

Note that the first DC modulator 32 of the first embodiment includes the slit 70A that is formed in the arrangement face 54C for the ground electrode 22B and the slit 70A that is formed in the arrangement face 54C for the signal electrode 22A. For example, the distance between the part of the ground electrode 22B and the film optical waveguide and the distance between the part of the signal electrode 22A and the film optical waveguide 60 are set equal to each other; however, the distance is not limited to this, and an embodiment thereof will be described as a sixth embodiment below.

[f] Sixth Embodiment

Figure 8:
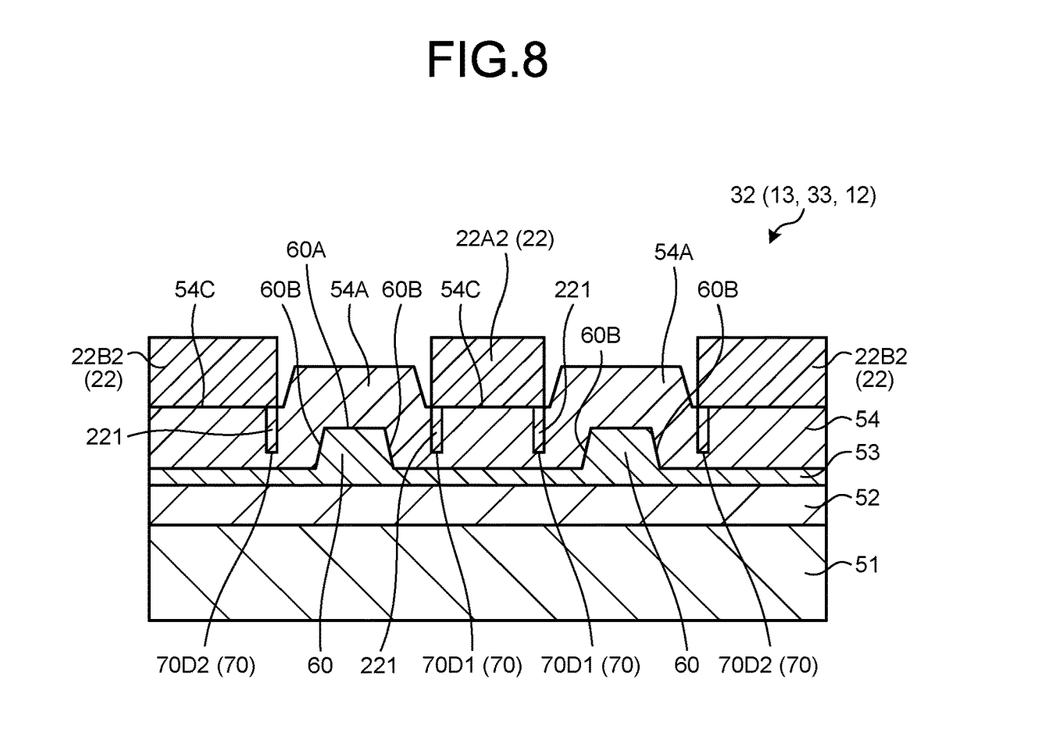
FIG. 8 is a schematic cross-sectional view illustrating an example of a first DC modulator of an optical modulator of a sixth embodiment.

FIG. 8 is a schematic cross-sectional view illustrating an example of the first DC modulator 32 of the optical modulator 5 of the sixth embodiment. Note that the same components as those of the optical modulator 5 of the first embodiment will be denoted with the same reference numerals as those of the first embodiment and thus description of the redundant components and operations will be omitted. The first DC modulator 32 illustrated in FIG. 8 is different from the first DC modulator 32 illustrated in FIG. 3 in including a first slit 70D1 that extends from the arrangement face 54C on which the signal electrode 22A2 is arranged to the vicinity of the film optical waveguide 60 and a second slit 70D2 that extends from the arrangement face 54C on which the ground electrode 22B2 is arranged to the vicinity of the film optical waveguide 60. Furthermore, the first slit 70D1 is set closer to the film optical waveguide 60 than the second slit 70D2 is.

The first slit 70D1 is filled with the part 221 of the electrode of the signal electrode 22A2 on the arrangement face 54C. The second slit 70D2 is filled with the part 221 of the electrode of the ground electrode 22B2 on the arrangement face 54C.

In the first DC modulator 32 of the sixth embodiment, compared to the second slit 70D2, the first slit 70D1 is set close to the film optical waveguide 60 and the part 221 of the electrode of the signal electrode 22A2 is arranged in the first slit 70D1. In the first DC modulator 32, because the part of the electrode of the signal electrode 22A2 is set close to the film optical waveguide 60, the electric field to be applied to the film optical waveguide 60 is strong. Furthermore, in the first DC modulator 32, compared to the signal electrode 22A2, the part of the electrode of the ground electrode 22B2 is set distant from the film optical waveguide 60, which enables inhibition of absorption of light by the ground electrode 22B2.

In the second DC modulator 33, compared to the second slit 70D2, the first slit 70D1 is set close to the film optical waveguide 60 and the part 221 of the electrode of the signal electrode 22A2 is arranged in the first slit 70D1. In the second DC modulator 33, because the part of the electrode of the signal electrode 22A2 is set close to the film optical waveguide 60, the electric field to be applied to the film optical waveguide 60 is strong. Furthermore, in the second DC modulator 33, compared to the signal electrode 22A2, the part of the electrode of the ground electrode 22B2 is set distant from the film optical waveguide 60, which enables inhibition of absorption of light by the ground electrode 22B2.

In the RF modulator 12, compared to the second slit 70D2, the first slit 70D1 is set close to the film optical waveguide 60 and the part 221 of the electrode of the signal electrode 22A2 is arranged in the first slit 70D1. In the RF modulator 12, because the part of the electrode of the signal electrode 22A2 is set close to the film optical waveguide 60, the electric field to be applied to the film optical waveguide 60 is strong. Furthermore, in the RF modulator 12, compared to the signal electrode 22A2, the part of the electrode of the ground electrode 22B2 is set distant from the film optical waveguide 60, which enables inhibition of absorption of light by the ground electrode 22B2.

According to one mode of an optical device disclosed herein, etc., it is possible to increase efficiency in applying an electric field.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
   an optical waveguide;
   a buffer layer that is layered on the optical waveguide;
   an electrode that is arranged on an arrangement face of the buffer layer that is layered in a part of a side face of the optical waveguide so as not to overlap the optical waveguide under the electrode and that applies an electric signal to the optical waveguide; and
   a slit that is formed in the buffer layer and that is filled with part of the electrode,
   wherein the slit has a structure to extend in a vertical direction from the arrangement face of the buffer layer to a vicinity of the side face of the optical waveguide so as to set a tip of the part of the electrode close to the side face of the optical waveguide in which a first distance between the tip of the part of the electrode in the slit and the optical waveguide is shorter than to a second distance between the electrode on the arrangement face and the optical waveguide.

2. The optical device according to claim 1, wherein the optical waveguide is a rib waveguide that has a core and a slab, and
   the slit extends from the arrangement face of the buffer layer on which the electrode is arranged to a vicinity of a side face part of the core of the rib waveguide.

3. The optical device according to claim 1, wherein the optical waveguide is a channel waveguide, and
   the slit extends from the arrangement face of the buffer layer on which the electrode is arranged to a vicinity of a side face part of the channel waveguide.

4. The optical device according to claim 1, wherein the slit extends from the arrangement face to a middle of the buffer layer.

5. The optical device according to claim 1, wherein the electrode includes:
   a signal electrode that is arranged on the arrangement face of the buffer layer that is layered in a part on one of side faces of the optical waveguide; and
   a ground electrode that is arranged on the arrangement face of the buffer layer that is layered in a part on an other side face of the optical waveguide, and
   the slit is formed in the buffer layer such that the slit extends from the signal electrode to a vicinity of the optical waveguide and is filled with part of the signal electrode.

6. The optical device according to claim 5, wherein the slit includes:
   a first slit that extends from the arrangement face on which the signal electrode is arranged to the vicinity of the optical waveguide; and
   a second slit that extends from the arrangement face on which the ground electrode is arranged to the vicinity of the optical waveguide, and
   the first slit is structured such that the first slit is closer to the optical waveguide than the second slit.

7. The optical device according to claim 1, wherein the optical waveguide is an optical waveguide of film lithium niobate (LN) crystal.

8. The optical device according to claim 7, wherein the optical waveguide is formed using an X-cut substrate of the film LN crystal.

9. The optical device according to claim 1, wherein the electrode is a direct current (DC) electrode.

10. The optical device according to claim 1, wherein the electrode is a radio frequency (RF) electrode.

11. An optical communication device comprising:
    a processor configured to execute signal processing on an electric signal;
    a light source configured to generate light; and
    an optical device configured to modulate the light that is generated from the light source using an electric signal that is output from the processor,
    wherein the optical device includes:
    an optical waveguide;
    a buffer layer that is layered on the optical waveguide;
    an electrode that is arranged on an arrangement face of the buffer layer that is layered in a part of a side face of the optical waveguide so as not to overlap the optical waveguide under the electrode and that applies an electric signal to the optical waveguide; and
    a slit that is formed in the buffer layer and that is filled with part of the electrode, wherein the slit has a structure to extend in a vertical direction from the arrangement face of the buffer layer to a vicinity of the side face of the optical waveguide so as to set a tip of the part of the electrode close to the side face of the optical waveguide in which a first distance between the tip of the part of the electrode in the slit and the optical waveguide is shorter than to a second distance between the electrode on the arrangement face and the optical waveguide.

12. An optical device comprising:
an optical waveguide;
a buffer layer that is layered on the optical waveguide;
an electrode that is arranged on an arrangement face of the buffer layer that is layered in a part of a side face of the optical waveguide so as not to overlap the optical waveguide under the electrode and that applies an electric signal to the optical waveguide; and
a slit that is formed in the buffer layer and that is filled with part of the electrode,
wherein the slit has a structure to extend obliquely from the arrangement face of the buffer layer toward a side face part of the optical waveguide so as to set a tip of the part of the electrode close to the side face of the optical waveguide in which a first distance between the tip of the part of the electrode in the slit and the optical waveguide is shorter than to a second distance between the electrode on the arrangement face and the optical waveguide.

* * * * *